(12) United States Patent
Liao

(10) Patent No.: US 8,458,369 B2
(45) Date of Patent: Jun. 4, 2013

(54) AUTOMATIC PERIPHERAL DISCOVERY, AUTHORIZATION, AND SHARING ACROSS AN INTERNET PROTOCOL NETWORK

(75) Inventor: Robert H Liao, Chestnut Hill, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 355 days.

(21) Appl. No.: 12/841,677

(22) Filed: Jul. 22, 2010

(65) Prior Publication Data
US 2012/0023265 A1    Jan. 26, 2012

(51) Int. Cl.
*G06F 3/00*  (2006.01)
*G06F 5/00*  (2006.01)

(52) U.S. Cl.
USPC ..................................... 710/5; 710/36; 710/17

(58) Field of Classification Search
None
See application file for complete search history.

(56) References Cited

U.S. PATENT DOCUMENTS

2009/0019187 A1* 1/2009 Okuma ............................ 710/9
2010/0161725 A1* 6/2010 Gershom ...................... 709/203

* cited by examiner

*Primary Examiner* — Idriss N Alrobaye
*Assistant Examiner* — Zachary K Huson

(57) ABSTRACT

A wireless mesh includes a plurality of user devices. A list is formed that includes information regarding peripheral devices associated with the user devices. One of the user devices identifies one or more of the peripheral devices that correspond to a particular type of peripheral device and selects, from the identified peripheral devices, a particular peripheral device. The particular peripheral device is associated with another user device, and the user device forms a session, with the other user device, that enables the user device to provide commands to the particular peripheral device via the other user device.

21 Claims, 15 Drawing Sheets

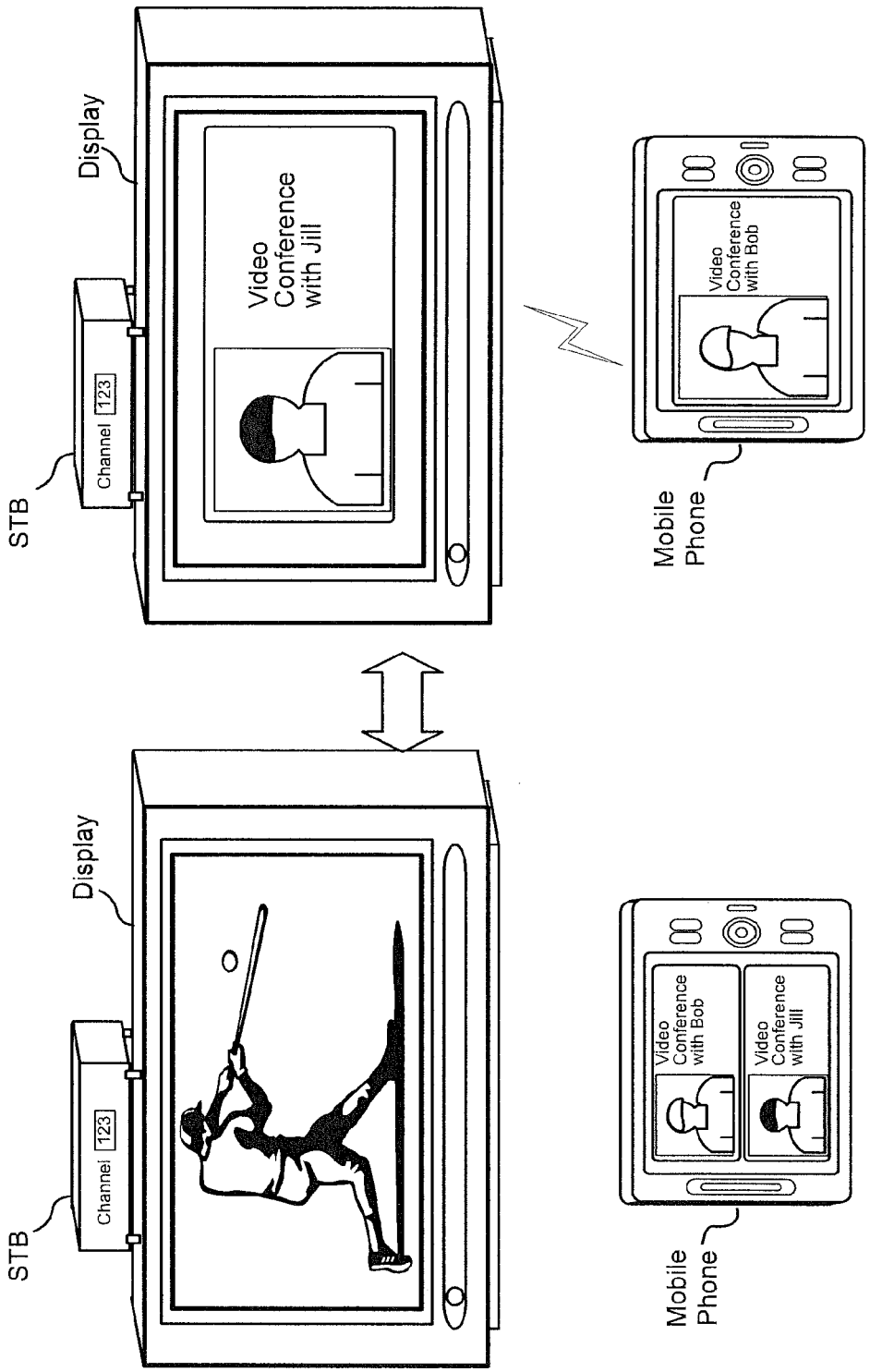

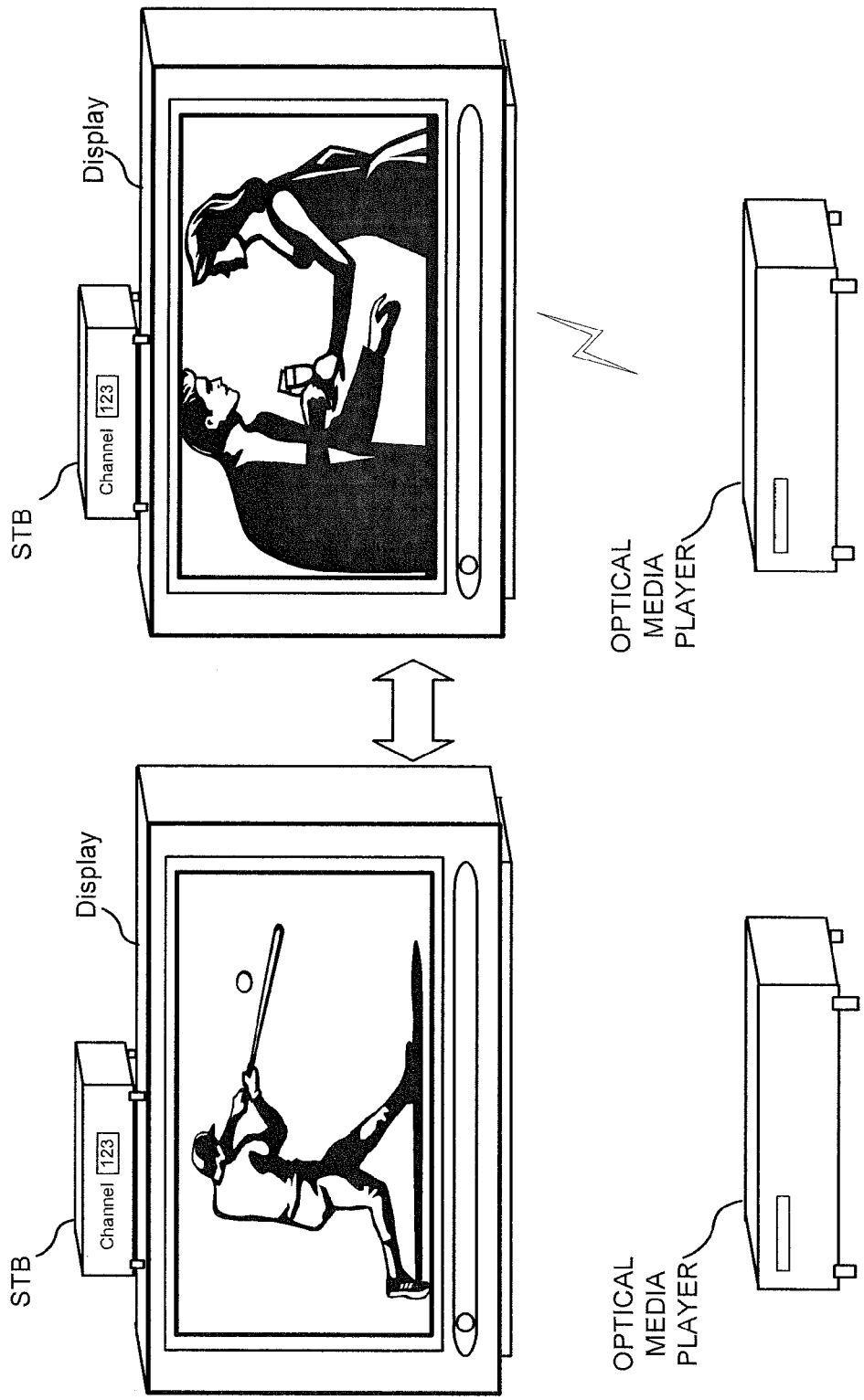

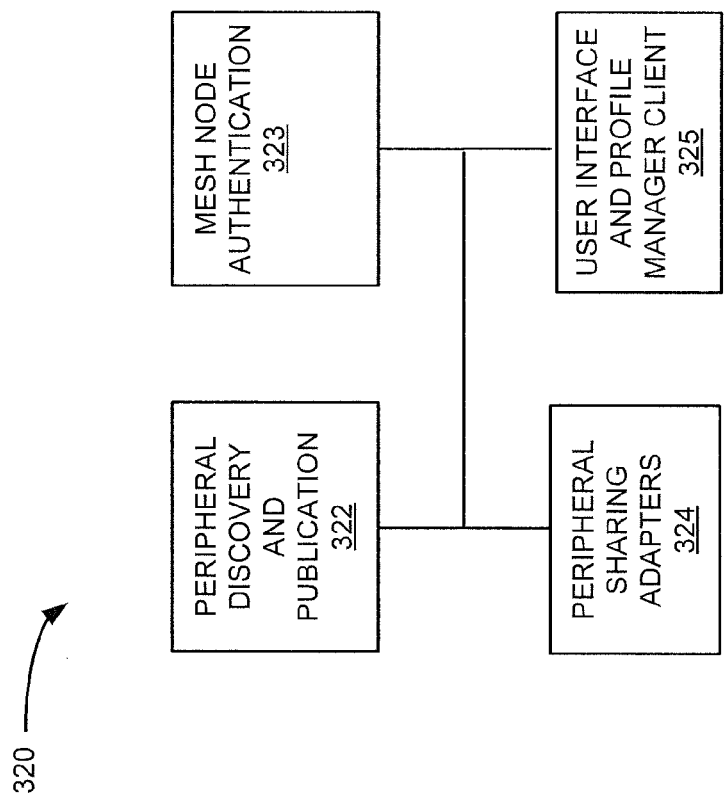

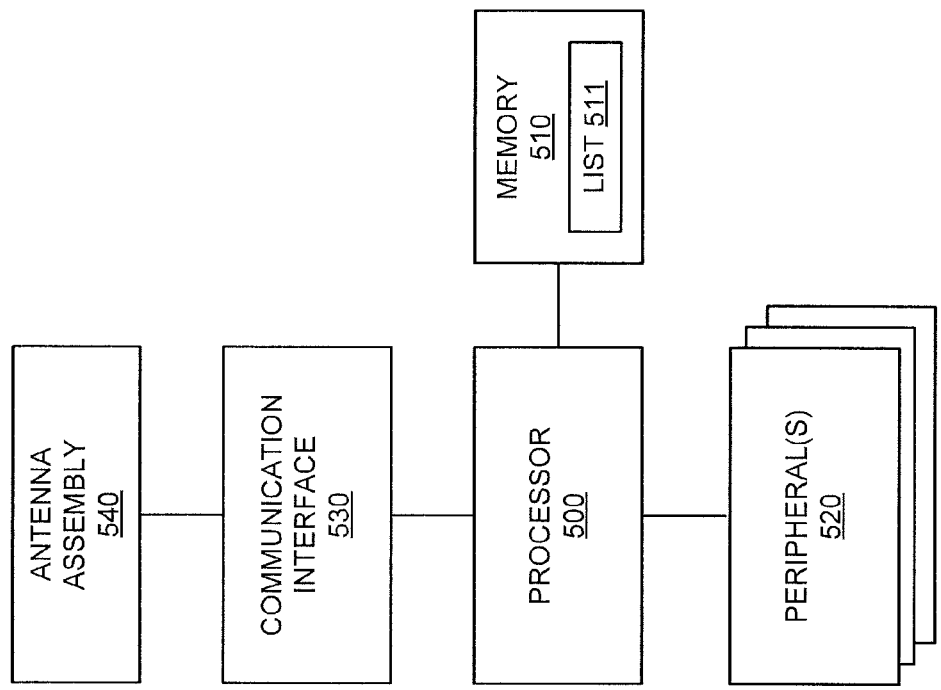

| PERIPHERAL ID 610 | DEVICE TYPE 620 | ATTRIBUTES 630 |
|---|---|---|
| DEVICE 1 | DISPLAY DEVICE | SIZE |
| DEVICE 2 | AUDIO DEVICE | RESOLUTION SPEAKER TYPE |
| DEVICE 3 | KEYBOARD | KEYBOARD TYPE |
| DEVICE 4 | MOUSE | MOUSE BRAND |
| DEVICE 5 | READABLE STORAGE | OPTICAL DRIVE TYPE |
| DEVICE 6 | WRITABLE STORAGE | FREE SPACE |

FIG. 6

| MESH NODE ID 710 | PERIPHERAL(S) ID 720 | DEVICE TYPE 730 | ATTRIBUTES 740 | AVAILABILITY 750 |
|---|---|---|---|---|
| MESH NODE 1 | PERIPHERAL 1-1 | DISPLAY | RESOLUTION | NO (IN USE AT MESH NODE 1) |
| | PERIPHERAL 1-2 | KEYBOARD | TYPE A | YES |
| | PERIPHERAL 1-3 | MOUSE | BRAND A | YES |
| MESH NODE 2 | PERIPHERAL 2-1 | KEYBOARD | TYPE B | YES |
| | PERIPHERAL 2-2 | WRITABLE STORAGE | AVAILABLE SPACE | YES |
| MESH NODE 3 | PERIPHERAL 3-1 | DISPLAY | RESOLUTION | YES |
| | PERIPHERAL 3-2 | KEYBOARD | TYPE A | NO (IN USE AT MESH NODE 1) |
| | PERIPHERAL 3-3 | READABLE STORAGE | DRIVE TYPE | YES |

FIG. 7A

| MESH NODE ID 710 | PERIPHERAL(S) ID 720 | DEVICE TYPE 730 | ATTRIBUTES 740 | AVAILABILITY 750 |
|---|---|---|---|---|
| MESH NODE 1 | PERIPHERAL 1-2 | KEYBOARD | TYPE A | YES |
| MESH NODE 2 | PERIPHERAL 2-1 | KEYBOARD | TYPE B | YES |
| MESH NODE 3 | PERIPHERAL 3-2 | KEYBOARD | TYPE A | NO – IN USE BY MESH NODE 1 |
| MESH NODE 1 | PERIPHERAL 1-1 | DISPLAY | RESOLUTION A | NO – IN USE BY MESH NODE 1 |
| MESH NODE 3 | PERIPHERAL 3-1 | DISPLAY | RESOLUTION B | YES |
| MESH NODE 1 | PERIPHERAL 1-3 | MOUSE | BRAND A | YES |
| MESH NODE 2 | PERIPHERAL 2-2 | WRITABLE STORAGE | AVAILABLE SPACE | YES |
| MESH NODE 3 | PERIPHERAL 3-3 | READABLE STORAGE | DRIVE TYPE | YES |

FIG. 7B

AUTOMATIC PERIPHERAL DISCOVERY, AUTHORIZATION, AND SHARING ACROSS AN INTERNET PROTOCOL NETWORK

BACKGROUND INFORMATION

A user typically possesses multiple computing devices. It is not uncommon for each of the computing devices to have its own peripheral devices. A peripheral device associated with a first computing device typically cannot be easily accessed and/or used by a second computing device without, for example, manually disconnecting the peripheral device from the first computing device and connecting the peripheral device to the second device. Furthermore, a computing device is typically unaware of peripheral devices associated with other computing devices associated with the user.

BRIEF DESCRIPTION OF THE DRAWINGS

FIGS. 1A-1E provide diagrams illustrating a concept described herein;

FIGS. 3A and 3B are block diagrams of example components of a computer device that may be used in the network of FIG. 2;

FIGS. 5A and 5B are block diagrams of example components of a user device that may be used in the network of FIG. 2;

FIG. 6 is a block diagram of an example peripheral list that may be formed by a component of the network of FIG. 2;

FIGS. 7A and 7B are block diagrams of example aggregated peripheral lists that may be formed by a component of the network of FIG. 2;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may provide a mesh network (herein "mesh") in which user devices, functioning as nodes in the mesh, share hardware components, such as peripheral input/output devices, to expand the capabilities of the computer devices. One mesh node may communicate with one or more other mesh nodes at a user's premises via a wireless connection, to establish a wireless mesh such that the mesh nodes may exchange lists of sharable peripheral devices associated with the respective mesh nodes and may provide access to the listed peripheral devices.

The mesh nodes may automatically exchange peripheral lists, for example, at the formation of the mesh. The mesh nodes may update peripheral lists, for example, periodically or in response to an event, such as a change in the mesh caused by a node entering or leaving the mesh. The mesh nodes may also exchange peripheral lists in response to an action at one of the mesh nodes, such as activating an application that may use a peripheral device or receiving a user input requesting a peripheral device located on another mesh node.

A node in the mesh may locate and access a peripheral device associated with another node in the mesh, for example, in response to activating an application that may use the peripheral device. For example, a user, when accessing an application provided at one mesh node, may use a peripheral device associated with another mesh node to interact with the application.

The peripheral lists may be separately stored at each of the mesh nodes. In another implementation, a central mesh node (also referred to as a "device") may collect, aggregate, and store the peripheral lists, and the other mesh nodes may access the peripheral lists, via that central mesh node, to locate a desired peripheral device.

As used herein, the term "peripheral" or "peripheral device" may be defined as a device attached to a mesh node to expand the mesh node's capabilities. For example, a peripheral device may provide additional storage; input to the mesh node; and/or output from the mesh node. Examples of peripheral devices may include keyboards, keypads, printers, image scanners, tape drives, microphones, loud speakers, webcams, digital cameras, storage devices, disc drives, etc. It should be appreciated this list of peripherals is merely provided for purposes of example and that additional types of peripheral devices are known and/or may developed, and these additional types of peripherals may be incorporated within the embodiments disclosed herein.

Figure 1A:
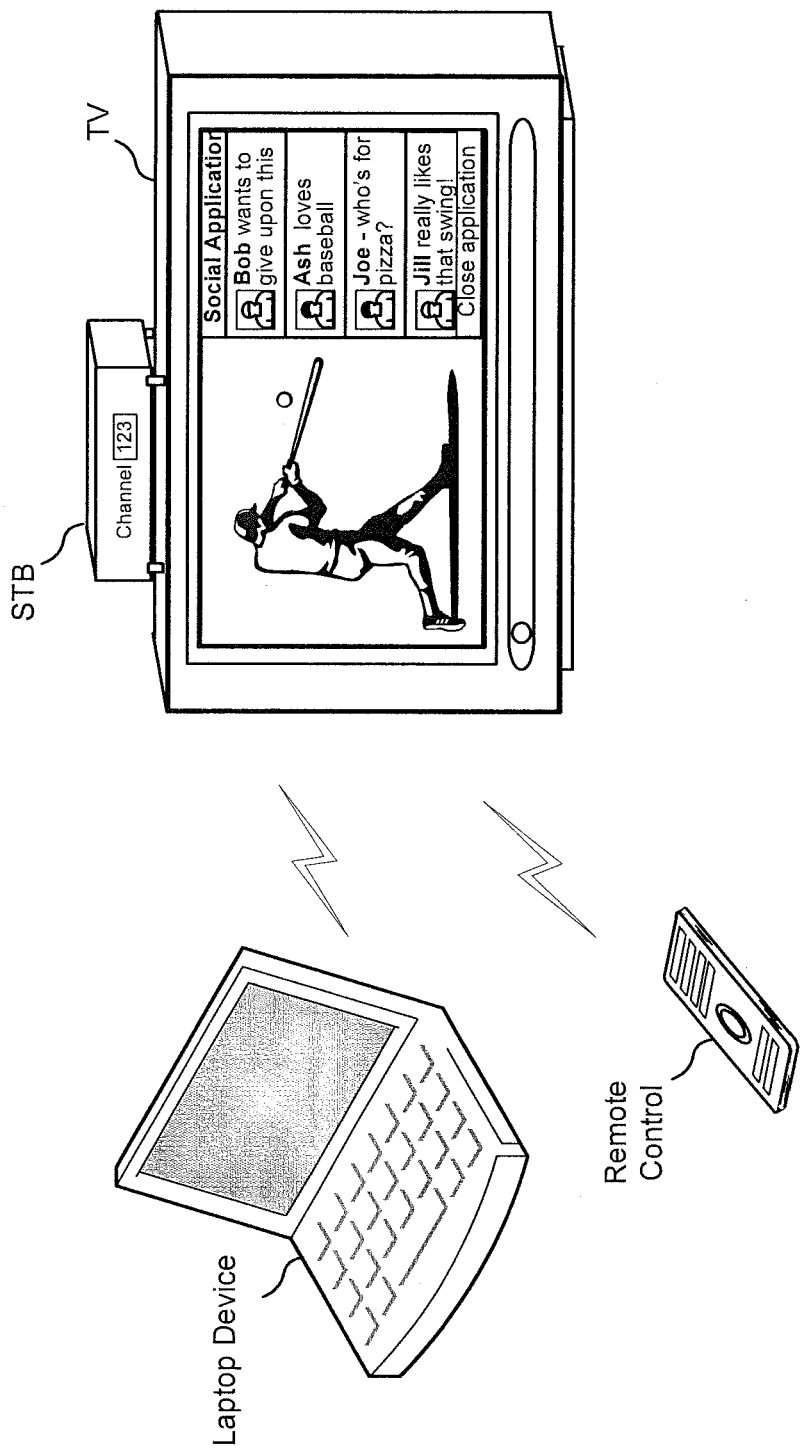

FIG. 1A provides an example implementation of a concept described herein. In FIG. 1A, a television (TV) display includes program content (e.g., a television program) and an application. Both the program content and the application may be supplied by a set-top box (STB) communicating with a backend server (not shown) for a multimedia service. The application may be controlled by a user, via a remote control, and may include, for example, an e-mail application, a social networking interface, etc. In some cases, it may be desirable for a user, when using the application, to use an additional type of input device that may not be available through the STB. For example, the user of the remote control may desire a different interface device when using the application, and the STB, upon activation of the application, may locate, via a mesh, a keyboard of a laptop device on the mesh and assume control of the keyboard to allow the user to use the keyboard to input text and/or otherwise control the application. In this way, the STB may borrow, via a wireless mesh, an input device, or another peripheral device, associated with another mesh node.

FIGS. 1B and 1C provide another example implementation of a concept described herein in which the STB may provide, via a wireless mesh, an associated peripheral device, such as a display, for use by another mesh node. FIG. 1B depicts a television display that originally includes program content (e.g., television program) provided by the STB while an application (e.g., a group video conference) is provided on a second device (e.g., a mobile phone). The user of the mobile phone may direct the mobile phone to interact with the STB to assume control of the television display. As depicted in FIG. 1C, the mobile phone may use the television display for the application, such as to display one party, from a group video conference, on the television display and another party from the group video conference on the mobile phone.

Although the examples depicted in FIGS. 1A-1C relate to sharing peripheral devices between the STB and a user device, such as a laptop device or a mobile phone, it should be appreciated that other types of user devices may possess a capability to join a mesh and to cooperate with the STB and/or other mesh nodes to share peripheral devices. For example, FIGS. 1D and 1E provide another example implementation of a concept described herein in which the STB may provide, via a wireless mesh, an associated peripheral device, such as a display, for use by an optical media player, such as a DVD or Blu-Ray® player. FIG. 1D depicts a television display that originally includes program content (e.g., television program) provided by the STB. The user of the optical media player may direct the optical media player to interact with the STB to assume control of the television display. As depicted in FIG. 1E, the optical media player may acquire content from optical media and provide this content, via the mesh, to the television display such that the content is displayed on the television display even though the optical media player may not be physically coupled, via a cable or wire, to the television display (or the STB). Alternatively, when the optical media player writes content to storage media, such as a writable DVD or Blu-Ray® disc, the STB may control, via the mesh, the optical media player to record information to the storage media, again even when the optical media player is not physically coupled, via a cable or wire, to either the television display or the STB.

Figure 2:
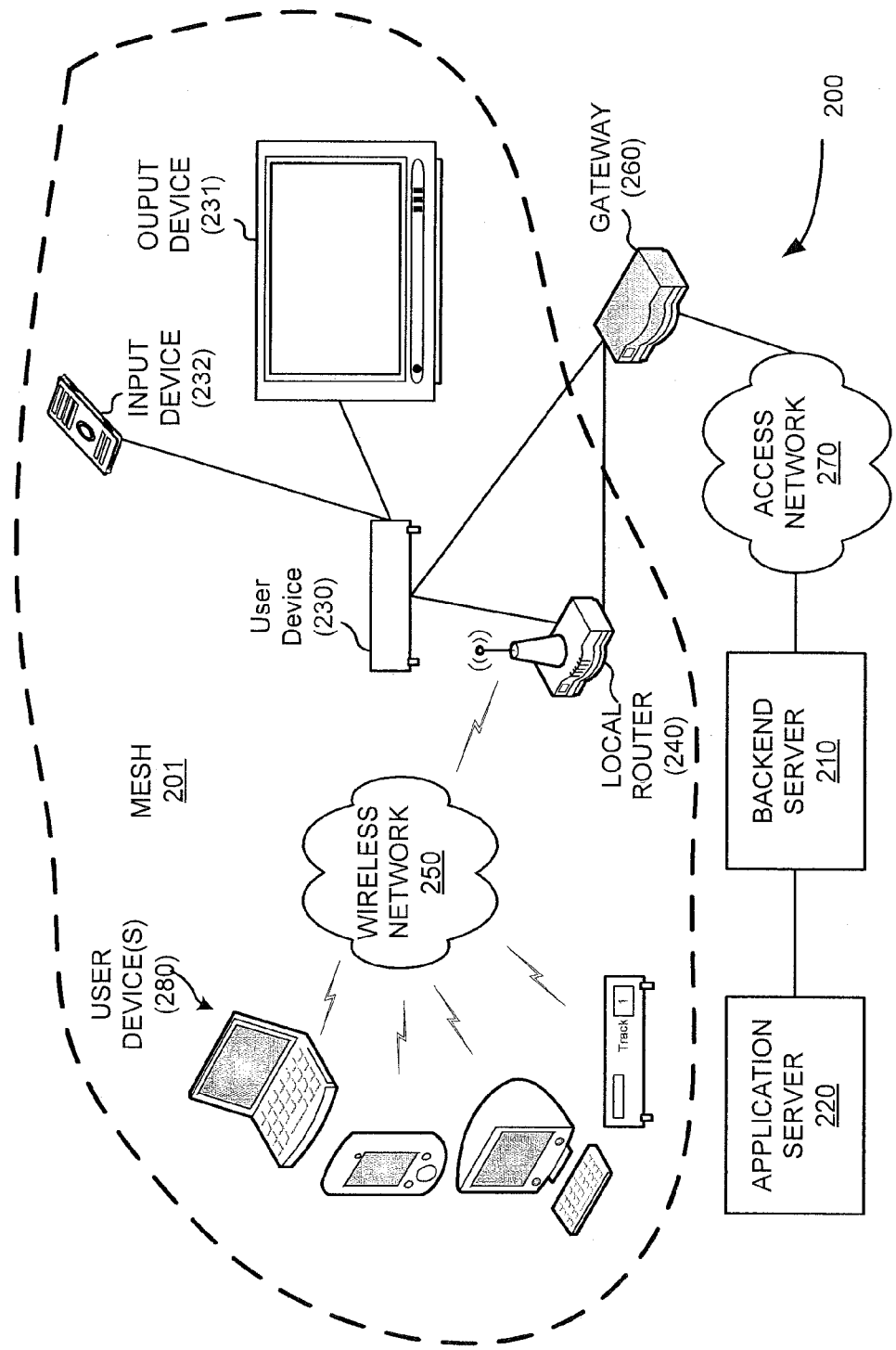
FIG. 2 depicts an example network in which systems and/or methods described herein may be implemented.

FIG. 2 is a diagram of an example network 200 in which systems and/or methods described herein may be implemented. As illustrated, network 200 may include a mesh 201, a backend server 210, an application server 220, a user device (or node) 230, output device 231, input device 232, a local router 240, a wireless network 250, a local gateway 260, an access network 270, and one or more user devices (or node(s)) 280 (referred to herein collectively as user device 280 or singularly as user device 280. Device 230, gateway 260, and devices 280 may be located on a user's premises and may be connected, via wireless network 250 and/or access network 270, to backend server 210 at, for example, a multimedia service provider's premises. Components of network 200 may interconnect via wired and/or wireless connections. Backend server 210, application server 220, user device 230, output device 231, input device 232, local router 240, wireless network 250, local gateway 260, access network 270, and four user devices 280 including a laptop computer, a smart phone, a desktop computer, and an optical media player are illustrated in FIG. 2. In practice, there may be more networks, servers, local gateways, computer devices, display devices, and/or mobile devices. Also, in some instances, one or more of the components of network 200 may perform one or more functions described as being performed by another one or more of the components of network 200.

User device 280 function as mesh nodes and may include a device capable of transmitting and receiving data (e.g., voice, text, images, and/or multimedia data) over wireless network 250 within mesh 201. User devices 280 may include, for example, a handheld device, such as a cellular telephone, an Internet protocol (IP) telephone, a personal digital assistant (PDA); a portable game and/or music playing device; a desktop computer; a laptop computer and/or palmtop receiver; an optical media player; and/or another device that includes a radiotelephone transceiver with Mobile Internet Protocol (Mobile IP) capabilities. In one implementation, user devices 280 may communicate, via a wireless communication protocol over wireless network 250, with local router 240. User device 280 may receive data and/or exchange hardware profiles of peripheral devices associated with user device 280 and user device 230. In one implementation, user device 280 may be capable of communicating (e.g., with another user device 230 and/or local router 240) using a short-range wireless communication protocol such as Bluetooth® or Wi-Fi®.

Mesh 201 may include user device 230 that may include any device capable of receiving, transmitting and/or processing information to and/or from access network 270. For the description to follow, user device 230 will be a media client, such as a STB or a computer. User device 230 need not be, however, a media client. User device 230 may be a closed device (e.g., including a hardware/software configuration that is not accessible to the general public) that restricts unauthorized alteration of programming delivered over access network 270. User device 230 may receive data, such as a television signal, from gateway 260, may convert the signal to a form usable by output device 231, and may transmit the converted signal to output device 231 for display. Examples of user device 230, when functioning as a media client, may include a set-top box, a computer, a cable card, and a portable electronic device. In some implementations, user device 230 may be incorporated into display device 231, such as a television, a computer, or a portable electronic device.

In an implementation described herein, user device 230 forms mesh 201 with other user devices 280 such that user device 230 may be capable of exchanging data with user devices 280 regarding, for example, available peripheral devices in mesh 201, the status of these peripheral devices, and/or requests and commands related to a remote access by one of user device 230 or user devices 280 to a peripheral device associated with another of user device 230 or user devices 280 in mesh 201 (e.g., via wireless network 250). In one implementation, data may be exchanged through an Internet protocol (IP) session in mesh 201 via wireless network 250. User device 230 may manage multiple user accounts and restrict/permit user input (e.g., user input from user device 280) based on the user accounts. User device 230 may also send data (e.g., user input from mobile device 280) to backend server 210 via access network 270.

Output device 231 may include a peripheral device, such as a digital or analog display, via which a user may view multimedia content (including, for example, television programming and/or television applications). Output device 231 may refer to any device that can receive and display multimedia content delivered over access network 270 and/or through user device 230 for perception by users. Output device 231 may include a technology, such as a cathode ray tube (CRT) display, a liquid crystal display (LCD), a light-emitting diode (LED) display, a plasma display, etc. Output device 231 may include other type of device for providing output, such as audio and/or sensory output, from user device 230.

Input device 232, associated with user device 230, may include, for example, a remote control or other peripheral device to enable a user to control user device 230 to display desired programming, such as television programming, on output device 231. Input device 232 may include a physical housing that supports a number of buttons to activate user device 230 and/or output devices 231, to enter a channel number to change a displayed channel, to control the display of shows recorded by user device 230, and/or to activate various applications. Alternatively, one of user devices 280, such as a smart phone, may be adapted to function as an input device to provide commands to user device 230 either directly, such as via RF or infrared control signals, or indirectly, via mesh 201 through wireless network 250.

Local router 240 may include a device that provides connectivity between components within a user's premises (e.g., user device 230, user devices 280, etc.) via wireless network 250 and between the user's premises components and access network 270. In one implementation, local router 240 may include a wireless router that permits user device 280 to connect to other user's premises components (e.g., user device 230) via wireless network 250 to form mesh 201. In one implementation, some or all of the features of local router 240 may be included within user device 230 or gateway 260.

Wireless network 250, enabled by local router 240, may include various types of wireless networks such, such as a wireless personal area network (WPAN) and/or a wireless local area network (WLAN). Wireless network 250 may employ one or more short-range wireless communication protocols, such as, for example, IEEE 802.15 (e.g., Bluetooth®) and IEEE 802.11 (e.g., Wi-Fi®). In another other implementation, different short-range wireless protocols and/or frequencies may be used.

Mesh 201 may be formed at a user's premises through wireless network 250 that may link, for example, user devices 280. Optionally, mesh 201 may provide an Internet connection through local router 240, via a connection to the gateway 260, that is shared wirelessly, via wireless network 250, by the mesh nodes, such as user devices 230 and 280. It should be appreciated, however, that mesh 201 may link nodes, such as user devices 280, without an Internet connection. The nodes in mesh 201, such as user device 230/280, may communicate, via wireless network 250 either directly node-to-node or indirectly, through local router 240, with other nodes in mesh 201. Mesh 201 may be self-configuring and self-healing such that mesh 201 may automatically incorporate a new node, such as another user device 230/280, into mesh 201 when the new node enters the user's premises or may remove a node, such as one of user device 230/280, from mesh 201 when that node leaves the user's premises or otherwise loses a connection to wireless network 250.

Gateway 260 may include a network device that provides an interface from access network 270 to user device 230, local router 240, and/or other network connectivity devices (not shown). For example, when telecommunication services are provided to the user's premises via an optical fiber, gateway 260 may include an optical network terminal (ONT) that connects to the optical fiber. The ONT may convert between signals appropriate for display device 231 and signals appropriate for transmission over optical fiber. For example, the ONT may include a coaxial cable connection that leads to display device 231 or user device 230. The ONT may also include an Ethernet output port that connects to local router 240, a personal computer, or a voice over Internet protocol (VoIP) telephone. In another implementation, gateway 260 may include one of a number of possible gateway devices, including a satellite antenna and receiver, a coaxial cable connection, or a broadband access for Internet Protocol TV (IPTV).

Access network 270 may include a video signaling and distribution network and/or system that permits transfer of data between backend server 210 and user device 230/local router 240. Additionally, access network 270 may include, among other things, a firewall, a filtering mechanism, a proxy, and/or network address translation mechanisms. Access network 270 may include, for example, a single network, such as a wide area network (WAN), a local area network (LAN), a metropolitan area network (MAN), a telephone network (e.g., a public switched telephone network (PSTN) or a wireless network), the Internet, a satellite network, a fiber optic network (such as FIOS®), etc., or a combination of networks. Access network 270 may provide users with multimedia content provided, for example, by backend server 210 and/or application server 220. Access network 270 may also support communications between backend server 210 and user device 230 using, for example, Internet protocol (IP).

Backend server 210 may include one or more computation or communication devices that gather, process, search, and/or provide information in a manner described herein. Examples of backend server 210 may include a headend device that provides broadcast television programs and/or pay-per-view (PPV) content, a video-on-demand (VOD) device or another device that provides multimedia content upon request, and/or a program guide information server that provides information related to multimedia content available to user device 230, such as media content. In general, backend server 210 may provide control over (e.g., via access network 270) multimedia services for devices, such as user device 230, provided at the user's premises. Backend server 210 may communicate with a variety of other components, such as databases, gateways, web servers, network switches or routers, television broadcast facilities, and other servers, to facilitate services to users.

Backend server 210 may also receive information from user device 230/280, such as device/user credentials, user selections of applications, and inputs for applications. In one implementation, backend server 210 may receive, from a user device 230, information from user device 280 (e.g., multiple user devices 280 each using a separate account associated with user device 230). Backend server 210 may also serve as a link between user device 230 and application server 220 to facilitate use of various applications by users of user device 230. For example, backend server 210 may facilitate communications initiated by user device 230 via access network 270. While shown as a single server component in FIG. 2, in other implementations, backend server 210 may be distributed among multiple servers.

Application server 220 may include one or more computation or communication devices that gather, process, search, and/or provide information in a manner described herein. Application server 220 may provide data to push application software and/or content for forming mesh 201 and/or for sharing peripheral devices between user device 230 and/or user devices 280. In one implementation, application server 220 may communicate with backend server 210 through a hypertext transfer protocol over secure socket layer (HTTPS) on the Internet. In one implementation, application server 220 may be controlled by a different entity than the entity that controls backend server 210. In another implementation, application server 220 and backend server 210 may be controlled by the same entity (e.g., a multimedia service provider).

Figure 3A:
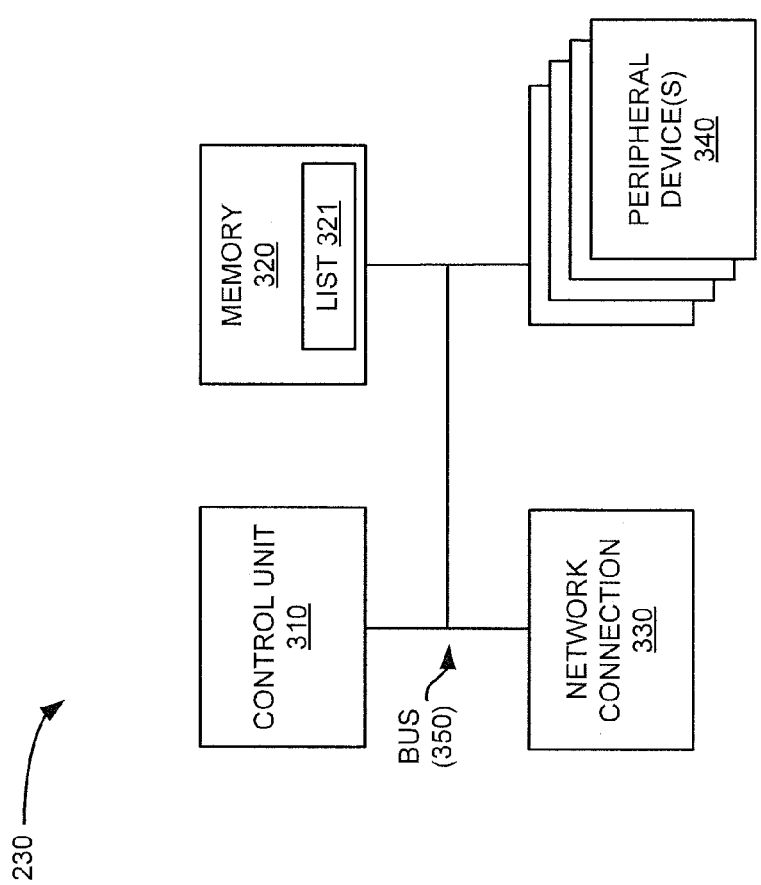

FIGS. 3A and 3B are diagrams illustrating example components of user device 230. As shown in FIG. 3A, user device 230 may include a control unit 310, a memory 320, a network connection 330, peripheral device(s) 340, and a bus 350. Although FIG. 3A illustrates a particular number and combination of components, in another implementation, user device may include additional components and/or may operate without one or more of the depicted components.

Control unit 310 may include a processor, a microprocessor, or another type of processing unit that interprets and executes instructions. Among other functions, control unit 310 may collect and store viewer activity associated with television programming. Control unit 310 may execute instructions to send viewing history information to another device, such as backend server 210. Control unit 310 may also receive information and/or instructions from other devices, such as backend server 210 and/or input device 232.

Memory 320 may include a dynamic and/or static storage device that stores information and instructions for execution or use by control unit 310. For example, memory 320 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, as described in greater detail below, memory 320 may store a list 321 that includes information regarding peripheral devices 340 associated with user device 230 and may further include information about peripheral devices associated with other nodes in mesh 201, such as user devices 280.

Network connection 330 may include a transceiver-like mechanism that enables user device 230 to communicate with other devices and/or systems, such as backend server 210. For example, network connection 340 may include an Ethernet interface, an optical interface, a coaxial interface, a radio interface, or the like. Network connection 340 may allow for wired and/or wireless communication. Network connection 340 may be configured to connect user device 230 to a packet-based IP network and/or wireless network 250.

Peripheral device 340 may include various devices associated with user device 230 to provide or store information or to enable a user to interact with user device 230. For example, peripheral device 340 may include an input/output device such as an external button and/or a LED indicator. With peripheral device 340, a user may interact with user device 230, and in some implementations, peripheral device 340 may include, for example, a remote control or other input device, such as a keyboard, game controller, mouse, touch screen display, etc. Peripheral device 340 may also include, for example, a display that includes any component capable of providing visual information. For example, in one implementation, peripheral device 340 may be a light emitting diode (LED) or a liquid crystal display (LCD). In another implementation, a display in peripheral device 340 may use another display technology, such as a dot matrix display, etc. A display, in peripheral device 340, may display, for example, text (such as a time, a date or a channel selection), image, and/or video information.

Bus 350 may provide an interface through which components of user device 230 can communicate with one another.

As will be described in additional detail below, user device 230 may perform certain operations relating to exchanging information related to peripheral devices, locating a desired peripheral device and/or accessing and controlling a peripheral device. User device 230 may perform these operations in response to control unit 310 executing software instructions contained in a computer-readable medium, such as memory 320. A computer-readable medium may be defined as a non-transitory physical or logical memory device. A logical memory device may refer to memory space within a single, physical memory device or spread across multiple, physical memory devices. The software instructions may be read into memory 320 from another computer-readable medium or from another device. The software instructions contained in memory 320 may cause control unit 310 to perform processes that will be described later. Alternatively, hardwired circuitry may be used in place of or in combination with software instructions to implement processes described herein. Thus, implementations described herein are not limited to any specific combination of hardware circuitry and software.

Referring now to FIG. 3B, memory 320 may store peripheral device discovery and publication instructions 322, mesh node authentication instructions 323, peripheral sharing adapters instructions 324, and user interface and profile manager client instructions 325. Peripheral device discovery and publication instructions 322 may cause user device 230 to exchange, with another user device 230 or user devices 280 on mesh 201, lists of peripheral devices available through mesh 201 such that the lists of available peripheral devices may be aggregated into a self-forming aggregate list of peripheral devices.

Mesh node authentication instructions 323 may cause user device 230, when requesting access to a desired peripheral device on user device 280 or when user device 280 requests access to a peripheral device on user device 230, to authenticate the request for the peripheral device. For example, mesh node authentication instructions 323 may cause user device 230 to forward appropriate credentials when requesting access to a peripheral device located on user device 280, or mesh node authentication instructions 323 may cause user device 230 to verify credentials of a user device 280 requesting access to a peripheral located on user device 230. The mesh node authentication instructions 323 may enable user device 230 to implement various levels of authentication such as open access in which a request for a peripheral is generally accepted or highly restrictive access in which a node on mesh 201 shares a peripheral in response to receiving sufficient security passwords and/or certificates. Mesh node authentication instructions 323 may be implemented by user device 230 each time a request for a peripheral is received. Alternatively, mesh node authentication instructions 323 may be implemented by user device 230 to exchange authentication information prior to receiving the request for the peripheral, such as during formation of mesh 201, with authentication of user devices 280 being retained to enable later access to a peripheral with reduced or no additional authentication.

Once user device 230 is authenticated to access a peripheral, peripheral sharing adapter instructions 324 may be implemented by user device 230 to provide appropriate commands to a remote peripheral. For example, peripheral sharing adapter instructions 324 may include information for forming a secure shell (SSH) connection between user device 230 and a desired peripheral located on user device 280. Peripheral sharing adapters instructions 324 may include, for example, information for controlling peripherals using various protocols, such as using remote framebuffer (RFB) protocol or remote desktop protocol (RDP) to control a display device; network file system (NFS) protocol or server message block (SMB) protocol to control a storage device or storage system; line printer daemon (LPD) or line printer remote (LPR) protocol to control a printer; and real time streaming protocol (RTSP) or real time messaging protocol (RTMP) to control a multimedia peripheral device, such as a speaker, microphone, or camera. Peripheral sharing adapter instructions 324 may include applications for controlling various peripherals, such as SYNERGY™, SYNERGY+™, MAXVISTA® or MULITPLICITY™ for sharing a keyboard and mouse. It should be appreciated that the above-identified protocols and applications included in peripheral sharing adapters instructions 324 are merely provided for purposes of example and that peripheral sharing adapters instructions 324 may not include some or all of the identified protocols and applications and/or may include additional protocols and/or applications. Moreover, user device 230 may acquire additional information or programs for peripheral sharing adapters instructions 324, as needed to control an identified remote peripheral device.

User interface and profile manager client instructions 325 may be implemented by user device 230, for example, in response to a user command, such as a remote control input or in response to activation of an application that may use a peripheral device, to display a list of available peripheral devices that is collected, for example, in response to invocation of peripheral device discovery and publication instructions 322. The user interface and profile manager client instructions 325 may enable a user to select one of the displayed available peripheral devices and then may invoke the mesh node authentication instructions 323 to establish a session with an appropriate user device 280, and may, upon authentication via the session, invoke peripheral sharing adapters instructions 324 to control the selected peripheral device.

Although FIGS. 3A and 3B illustrate example components of user device 230, in other implementations, user device 230 may include fewer, different, differently arranged, or additional components than those depicted in FIGS. 3A and 3B. In still other implementations, one or more components of user device 230 may perform one or more other tasks described as being performed by one or more other components of user device 230.

Figure 4:
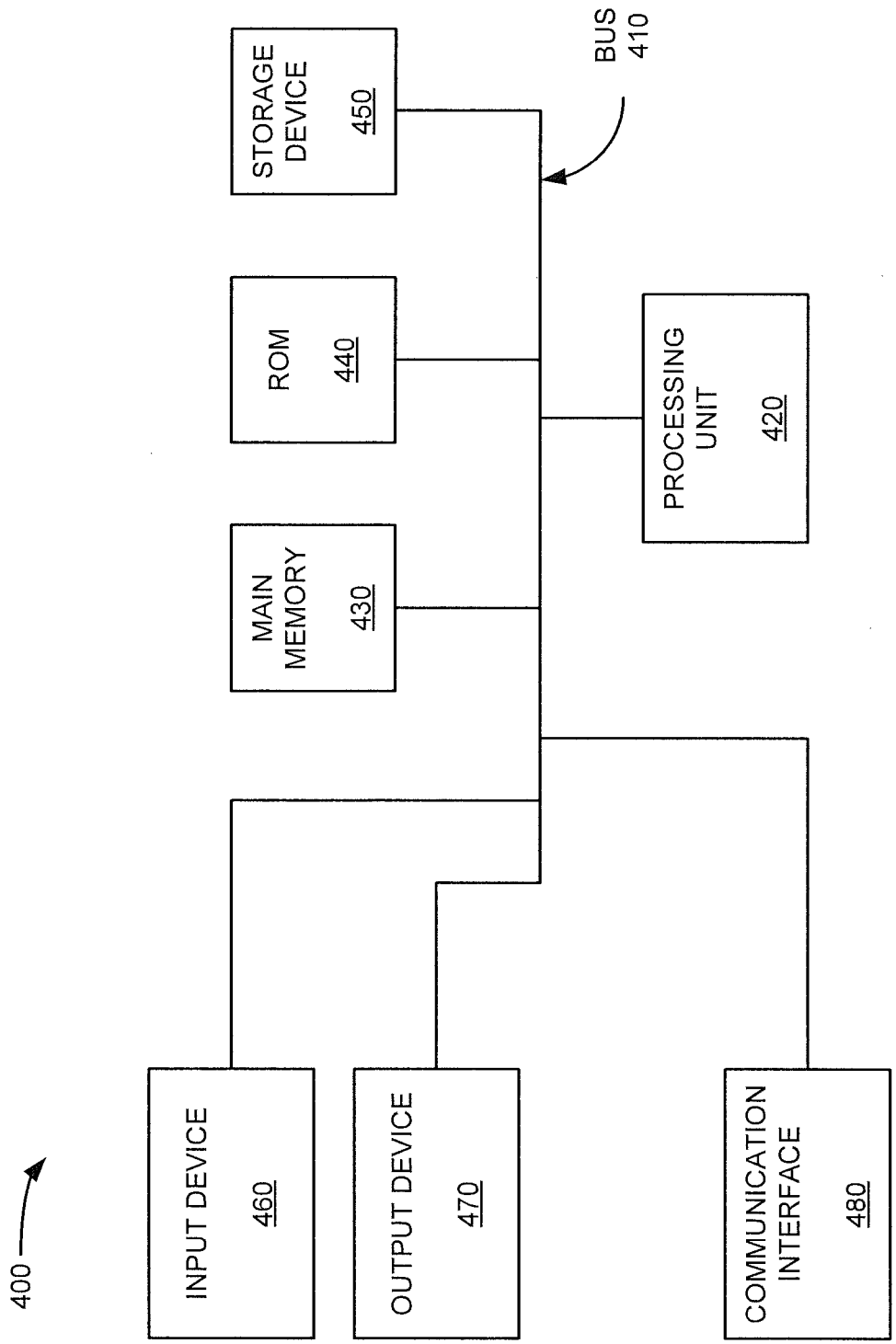
FIG. 4 is a block diagram of example components of a device that may correspond to a backend server and/or an application server of FIG. 2.

FIG. 4 is a diagram of example components of a device 400 that may correspond to backend server 210, application server 220, or another computing device. As illustrated, device 400 may include a bus 410, a processing unit 420, a main memory 430, a read-only memory (ROM) 440, a storage device 450, an input device 460, an output device 470, and a communication interface 480.

Bus 410 may include a path that permits communication among the components of device 400. Processing unit 420 may include a processor, a microprocessors or another type of processing unit, such as an application-specific integrated circuit (ASIC), a field-programmable gate array (FPGA), etc., that may interpret and execute instructions.

Main memory 430 may include a RAM or another type of dynamic storage device that stores information and instructions for execution by processing unit 420. ROM 440 may include a ROM device or another type of static storage device that may store static information and instructions for use by processing unit 420. Storage device 450 may include a magnetic and/or optical recording medium and its corresponding drive. In one implementation, storage device 450 may include a database. Storage device 450 may store, for example, viewer account activity for a particular user device 230 or multiple user devices 230 associated with a subscription multimedia service provider.

Input device 460 may include a mechanism that permits an operator to input information to device 400, such as a keyboard, a mouse, a pen, voice recognition and/or biometric mechanisms, a touch-screen interface, etc. Output device 470 may include a mechanism that outputs information to the operator, including a display, a printer, a speaker, etc. Communication interface 480 may include any transceiver-like mechanism that enables device 400 to communicate with other devices and/or systems, such as user device 230.

As will be described in detail below, device 400 may perform certain operations associated with providing an application to enable nodes on mesh 201, such as user device 230 and/or user devices 280, to exchange, via mesh 201, listings of peripheral devices and to share, via mesh 201, available peripheral devices. Device 400 may perform these and other operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of, or in combination with, software instructions to implement processes consistent with example implementations. Thus, implementations described herein are not limited to any specific combination of hardware circuitry and software.

Although FIG. 4 illustrates example components of device 400, in other implementations, device 400 may include fewer, different, differently arranged, or additional components than those depicted in FIG. 4. In still other implementations, one or more components of device 400 may perform one or more other tasks described as being performed by one or more other components of device 400.

Figure 5B:
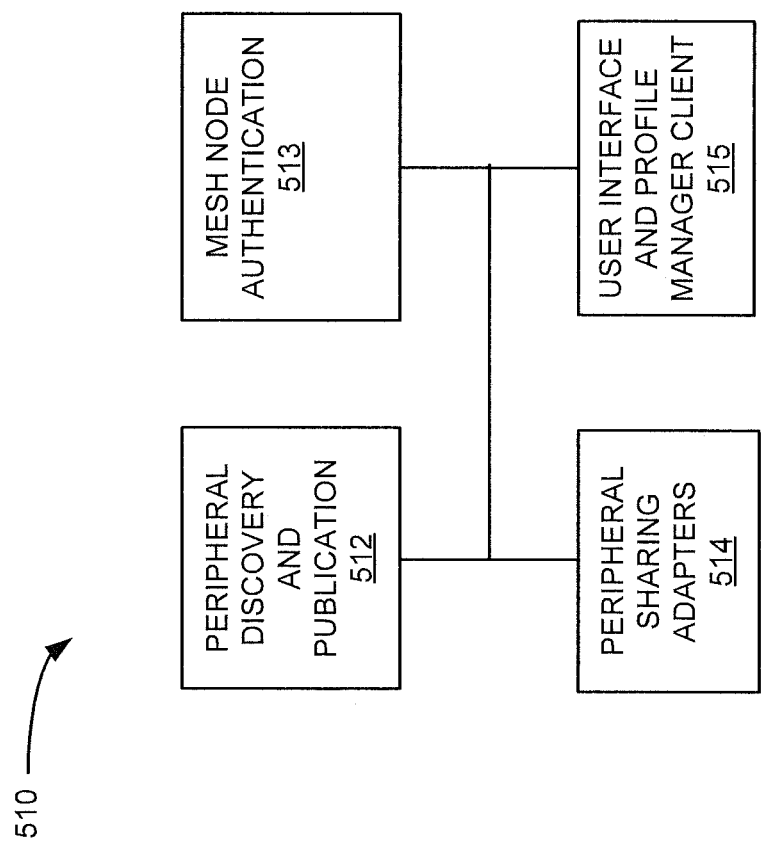

FIGS. 5A and 5B are diagrams of example components of user device 280. As illustrated, user device 280 may include, for example, processor 500, memory 510, peripheral device(s) 520, communication interface 530, and/or antenna assembly 540.

Processor 500 may include a microprocessor, an ASIC, a FPGA, or the like. Processor 500 may control operation of user device 280 and its components.

Memory 510 may include a RAM, a ROM, and/or another type of memory to store data and instructions that may be used by processor 500. In one implementation, memory 510 may store data used to display a graphical user interface, such as an interactive application. In one implementation, as described in greater detail below, memory 510 may store a list 511 that includes information on peripheral devices 520 associated with user device 280 and may further include information of peripheral devices associated with other nodes in mesh 201, such as user device 230 and/or other user devices 280.

Peripheral device 520 may include various user interfaces or other mechanisms for inputting information to user device 280 and/or for outputting information from user device 280. Examples of peripheral device 520 may include buttons (e.g., control buttons, keys of a keypad, a joystick, etc.); a speaker to receive electrical signals and output audio signals; a microphone to receive audio signals and output electrical signals; a display to receive touch input and/or to output visual information; a vibrator to cause user device 280 to vibrate; and/or a camera to receive video and/or images. Peripheral device 520 may include a printer, an image scanner, an optical and/or tape drive, a microphones, a loudspeakers, and/or a webcam.

Communication interface 530 may include, for example, a transmitter that may convert baseband signals from processor 500 to radio frequency (RF) signals and/or a receiver that may convert RF signals to baseband signals. Alternatively, communication interface 530 may include a transceiver to perform functions of both a transmitter and a receiver. Communication interface 530 may connect to antenna assembly 540 for transmission and/or reception of the RF signals over wireless network 250.

Antenna assembly 540 may include one or more antennas to transmit and/or receive RF signals over the air, such as to communicate via wireless network 250 and/or another RF network, such as a cellular communications or data network. Antenna assembly 540 may, for example, receive RF signals from communication interface 530 and transmit them over the air, and receive RF signals over the air and provide them to communication interface 530. In one implementation, communication interface 530 may communicate with a network (e.g., wireless network 250) and/or with devices connected to a network (e.g., local router 240).

As will be described in detail below, user device 280 may perform certain operations described herein in response to processor 500 executing software instructions of an application contained in a computer-readable medium, such as memory 510. The software instructions may be read into memory 510 from another computer-readable medium or from another device via communication interface 530. The software instructions contained in memory 510 may cause processor 500 to perform processes that will be described later. Alternatively, hardwired circuitry may be used in place of or in combination with software instructions to implement processes described herein. Thus, implementations described herein are not limited to any specific combination of hardware circuitry and software.

Referring now to FIG. 5B, memory 510 may store peripheral device discovery and publication instructions 512, mesh node authentication instructions 513, peripheral sharing adapters instructions 514, and user interface and profile manager client instructions 515. User device 280 may implement the peripheral device discovery and publication instructions 512 such that user device 280 may exchange, with user device 230 and/or other user devices 280 on mesh 201, lists of peripheral devices such that user device 280 can aggregate the lists of available peripheral devices into a self-forming aggregate listing of peripheral devices.

When requesting access to a desired peripheral device on user device 230 or another user device 280 on mesh 201 or when receiving a request for access to a peripheral device on user device 280, mesh node authentication instructions 513, when implemented, may cause user device 280 to authenticate the request for the peripheral device, such as user device 230 and/or user device 280 exchanging and verifying appropriate credentials. The mesh node authentication instructions 513 may enable various levels of authentication such as open access in which any request is accepted or highly restrictive access in which a node on mesh 201 shares a peripheral in response to receiving sufficient security passwords and/or certificates. User device 280 may activate the mesh node authentication instructions 513 each time a request for a peripheral is exchanged or, alternatively, user device 280 may activate the mesh node authentication instructions 513 to exchange authentication information prior to the request for the peripheral, such as during formation of mesh 201, with authentication of user device 230 or user devices 280 being retained to enable later access to a peripheral with reduced or no additional authentication.

Once a node on mesh 201 is authenticated to access a peripheral, implement peripheral sharing adapter instructions 514 may enable user device 280 to provide appropriate commands to a remote peripheral. For example, peripheral sharing adapters instructions 514 may include information for forming a SSH connection between user device 280 and a node on mesh 201 at which a desired peripheral is located. Peripheral sharing adapters instructions 514 may include, for example, information for controlling peripherals using various protocols, such as using RFB protocol or RDP to control a display device; NFS protocol or SMB protocol to control a storage device or storage system; LPD or LPR protocol to control a printer; and RTSP or RTMP to control a multimedia peripheral device, such a speaker, microphone, or camera. Peripheral sharing adapter instructions 514 may include applications for controlling various peripherals, such as SYNERGY™, MAXVISTA® or MULITPLICITY™ for sharing a keyboard and mouse. It should be appreciated that the above-identified protocols and applications are merely provided for purposes of example and that peripheral sharing adapters instructions 514 may not include some or all of the identified protocols and/or applications or may include additional protocols and/or applications. Moreover, user device 280 may acquire additional peripheral sharing adapters instructions 514 as needed to control a particular remote peripheral device.

User device 280 may invoke user interface and profile manager client instructions 515 for example, in response to, a user command, such as a control input, or in response to activation of an application that could use a peripheral device, to display a list of available peripheral devices that is collected, for example, in response to invocation of peripheral device discovery and publication instructions 512. The user interface and profile manager client instructions 515 may enable a user to select one of a displayed list of available peripheral devices, then may invoke the mesh node authentication instructions 513 to establish a session with an appropriate node on mesh 201, and may, upon authentication via the session, execute peripheral sharing adapters instructions 514 to control the selected peripheral device.

Although FIGS. 5A and 5B show example components of user device 280, in other implementations, user device 280 may contain fewer, different, differently arranged, or additional components than depicted in FIGS. 5A and 5B. In still other implementations, a component of user device 280 may perform one or more other tasks described as being performed by another component of user device 280.

FIG. 6 depicts an example peripheral device listing 600 that may include, for example, information on one or more peripheral devices associated with a node on mesh 201, such as user device 230 or user device 280. The information in peripheral device listing 600 may be collected from or otherwise based on, for example, a hardware configuration file for user device 230 or user device 280. Peripheral device list 600 may include, for example, peripheral device identifiers 610 and information describing one or more types, or categories, 620 and one or more attributes 630 associated with the identified peripheral device(s). For example, the peripheral device listing 600 may include information on peripheral devices associated with identifiers 610, including six associated types 620, such as display device, an audio device, a keyboard, a mouse, a readable storage device, and a writable storage device. Peripheral device listing 600 may also include one or more attribute(s) 630 for each of the corresponding peripheral devices identifiers 610, such as data on a size and resolution of a display device, a keyboard type, mouse brand, defining the readable storage device as an optical drive, and data providing available free space on the writable storage. Although not depicted in FIG. 6, peripheral device listing 600 may further include additional information regarding the peripheral devices, such as status information for one or more of the identified peripheral devices associated with peripheral device identifier 610.

It should be appreciated, however, that although FIG. 6 shows example data included in peripheral device listing 600, in other implementations, peripheral device listing 600 may contain fewer, different, differently arranged, or additional data fields than depicted in FIG. 6. In still other implementations, peripheral device listing 600 may combine, remove, or otherwise modify the data fields depicted in FIG. 6.

An aggregate peripheral device listing 700 is depicted in FIGS. 7A and 7B. As depicted in FIGS. 7A and 7B, user device 230/280 may collect peripheral device listing 600 from multiple nodes on mesh 201 to form an aggregate peripheral device listing 700 that may include information on peripheral devices associated with multiple nodes on mesh 201, such as user device 230 and user device 280. Aggregate peripheral device listing 700, as depicted in FIGS. 7A and 7B, may include, for example, mesh node identifiers 710 for mesh nodes, peripheral identifiers 720 for peripheral devices associated with each of the mesh nodes identified by mesh node identifiers 710, where peripheral identifiers 720 may correspond, for example, to peripheral identifiers 610 depicted in FIG. 6. The composite peripheral device listing 700 may further include, for example, information on type(s) 730, that may correspond, for example, to the peripheral type 620 depicted in FIG. 6, and attribute(s) 740 that correspond, for example, to peripheral attribute 630 depicted in FIG. 6, for each of the peripherals identified by peripheral identifier 720. In another implementation, the composite peripheral device listing 700 may further include status information, for a peripheral identified by peripheral identifier 720, such as to identify an availability 750 of the peripheral identified by peripheral identifier 720 based on whether the identified peripheral device is in use at the associated identified mesh node 710 or by another node on mesh 201.

Although FIG. 7A depicts that aggregate peripheral device listing 700 may be organized according to mesh node identifier 710 (such that peripheral devices associated with a same mesh node may grouped together), it should be appreciated that aggregate peripheral device listing 700 may also be sorted or organized in other ways. For example, as depicted in FIG. 7B, aggregate peripheral device listing 700 may be sorted such that similar device types 730 are organized together. As described in greater detail below, a sorted aggregate peripheral device listing 700 may be used to determine nodes, in mesh 201, associated with, for available, peripheral devices of a particular device type 730.

It should be appreciated, however, that although FIGS. 7A and 7B show example data included in aggregate peripheral device listing 700, in other implementations, aggregate peripheral device listing 700 may contain fewer, different, differently arranged, or additional data fields than depicted in FIGS. 7A and 7B. In still other implementations, aggregate peripheral device listing 700 may combine, remove, or otherwise modify the data fields depicted in FIGS. 7A and 7B.

Figure 8:
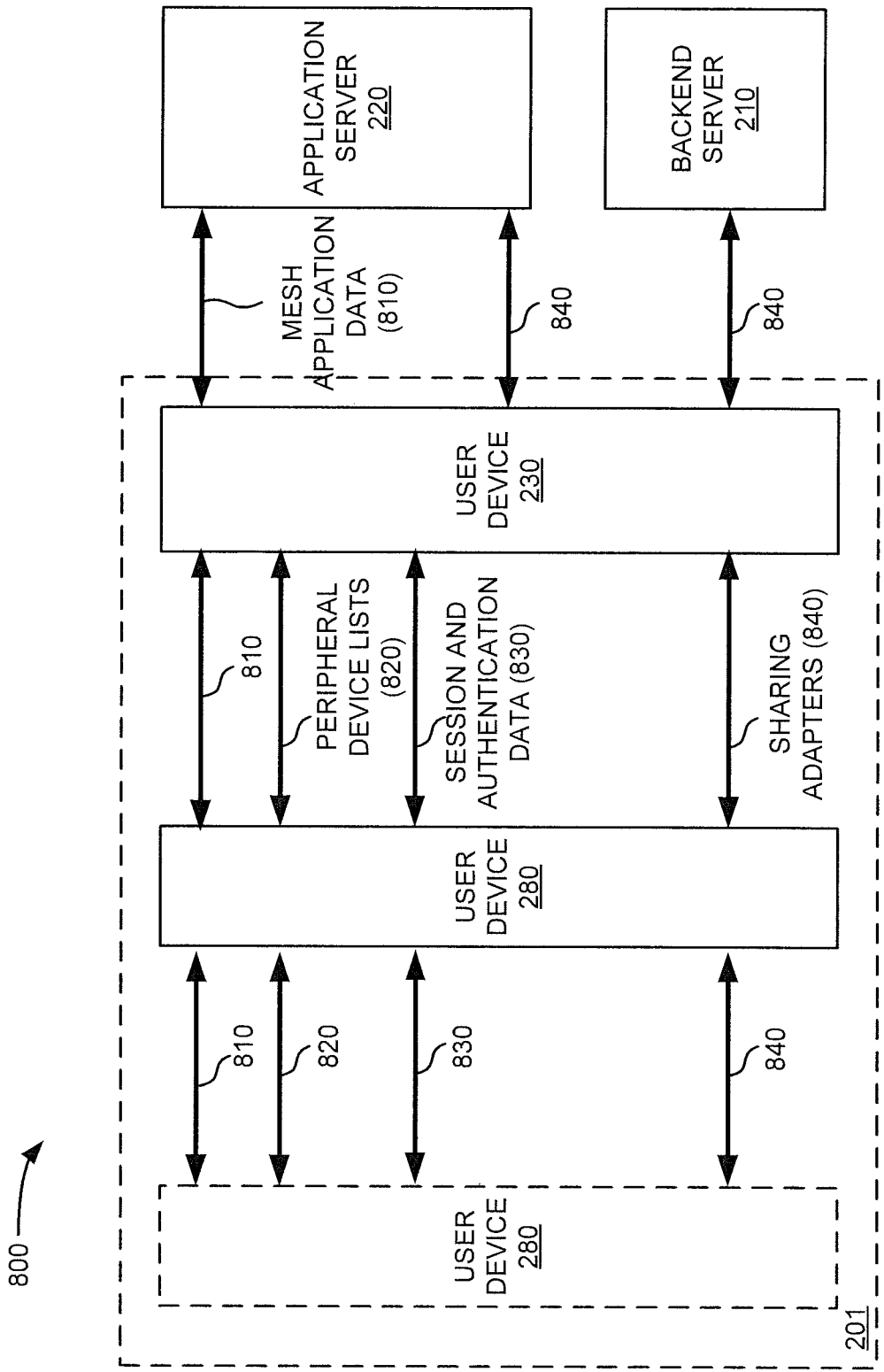
FIG. 8 depicts a diagram of example interactions among components of an example portion of the network illustrated in FIG. 2.

FIG. 8 depicts a diagram of example interactions among components of an example portion 800 of network 200. As illustrated, example network portion 800 may include backend server 210, application server 220, user device 230, and user device 280. Backend server 210, application server 220, user device 230, and user device 280 may include the features described above in connection with, for example, FIGS. 2-5.

As further shown in FIG. 8, user device 230/280 may, upon entering mesh 201, receive mesh application data 810 to join mesh 201 and to exchange information regarding associated peripheral devices. Alternatively, user device 230/280 may receive mesh application data 810 from another node in mesh 201, such as user device 230 or user device 280, and use mesh application data 810 to join mesh 201 and to exchange information regarding associated peripheral devices. The nodes in mesh 201, such as user device 230 and/or 280 may exchange peripheral device list 820, that correspond, for example, to peripheral device listing 600 depicted in FIG. 6 and/or aggregate peripheral device listing 700 depicted in FIGS. 7A and 7B, such that the nodes in mesh 201, such as user device 230 and/or 280, are aware of peripherals available through another node in mesh 201.

Mesh application data 810 may further include instructions to enable user device 230/280 to activate a user interface and profile manager client. For example, user device 230/280 may activate the user interface and profile manager client in response to a user input. Alternatively, when a mesh node, such as user device 230/280, determines a need for a peripheral device, the mesh node may identify another node, on mesh 201, associated with a needed peripheral device using the exchanged peripheral device list 820. For example, when a user attempts to activate an application, user device 230/280 may determine that the application is associated with a peripheral device that is not directly available through that user device 230/280. For example, the user interface and profile manager client may enable user device 230/280 to display, to a user, a list of available peripheral devices using the exchanged peripheral device list 820 and to accept, from the user, a selection of one of the listed peripheral devices.

Mesh application data 810 may further include instructions to enable user device 230/280 to conduct, in response to a selection of one of the listed peripheral devices, a session to exchange session and authentication data 830 with another user device 230/280 associated with the selected peripheral device to negotiate access and control of the desired peripheral device. The mesh session and authentication data 830 may enable various levels of authentication, such as open access in which any request is accepted or highly restrictive access in which a device on mesh 201 shares a peripheral device in response to receiving appropriate security passwords and/or certificates. As noted above, user devices 230/280 may exchange mesh session and authentication data 830 in response to receiving, from a user, a request for sharing a peripheral device. Alternatively, user devices 230/280 may exchange mesh session and authentication data 830 at a prior time, such as during formation of mesh 201, with authentication of user devices 230/280 being retained within mesh 201 to enable later shared access to peripheral devices with reduced or no additional authentication.

Mesh application data 810 may further include instructions to enable user device 230/280 requesting a peripheral device, once authorized through mesh session and authentication data 830 to access a requested peripheral device, to forward commands to the peripheral device, at another user device 230/280, using sharing adapters 840. For example, sharing adapters 840 may include information for forming a SSH connection between user device 230/280 and a node on mesh 201, such as another user device 230/280, on which the desired peripheral device is located. Sharing adapters 840 may include, for example, information for controlling a peripheral device using various protocols or applications. User device 230/280 may acquire sharing adapters 840 from application server 220 when receiving mesh application data 810 or may receive sharing adapters 840 from another mesh node, such as another user device 230/280 in response to requesting access to a peripheral device at that other mesh node. Alternatively, user device 230/280 may request and receive sharing adapters 840, as needed, from backend server 810.

Although FIG. 8 shows example components of network portion 800, in other implementations, network portion 800 may contain fewer, different, differently arranged, or additional components than depicted in FIG. 8. Additionally, or alternatively, one or more components of network portion 800 may perform one or more other tasks described as being performed by one or more other components of network portion 800. For example, although the above discussion generally describes that user device 230 receives mesh application data 810 and sharing adapters 840 from application server 220 and provides mesh application data 810 and sharing adapters 840 to user device 280, it should be appreciated that user device 230/280 may also receive one or more of mesh application data 810 and sharing adapters 840 from another user device 230/280 in mesh 201.

Figure 9A:
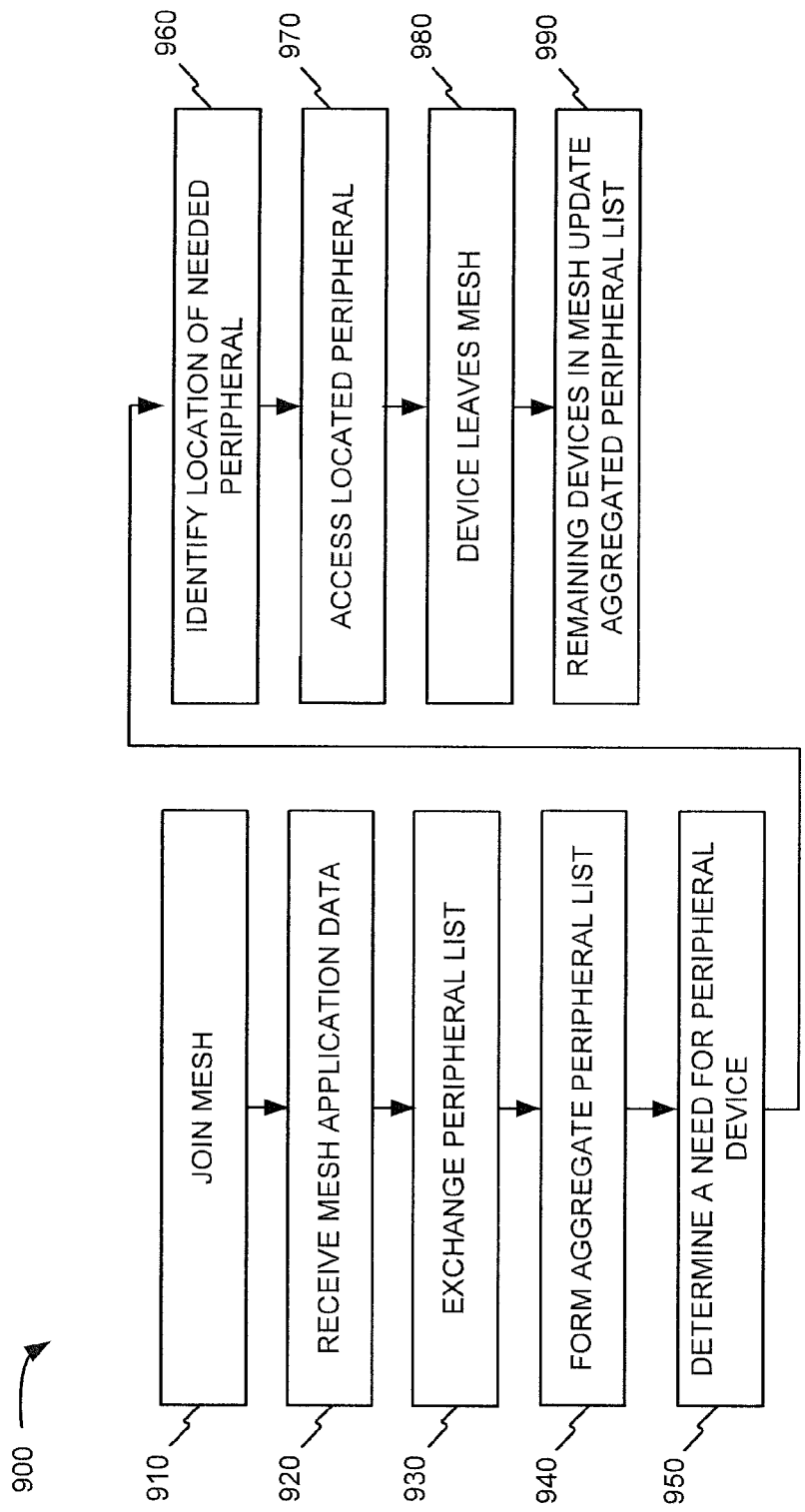
FIGS. 9A and 9B are flow charts illustrating an example process for providing automatic peripheral discovery, authorization, and sharing across a network.
Figure 9B:
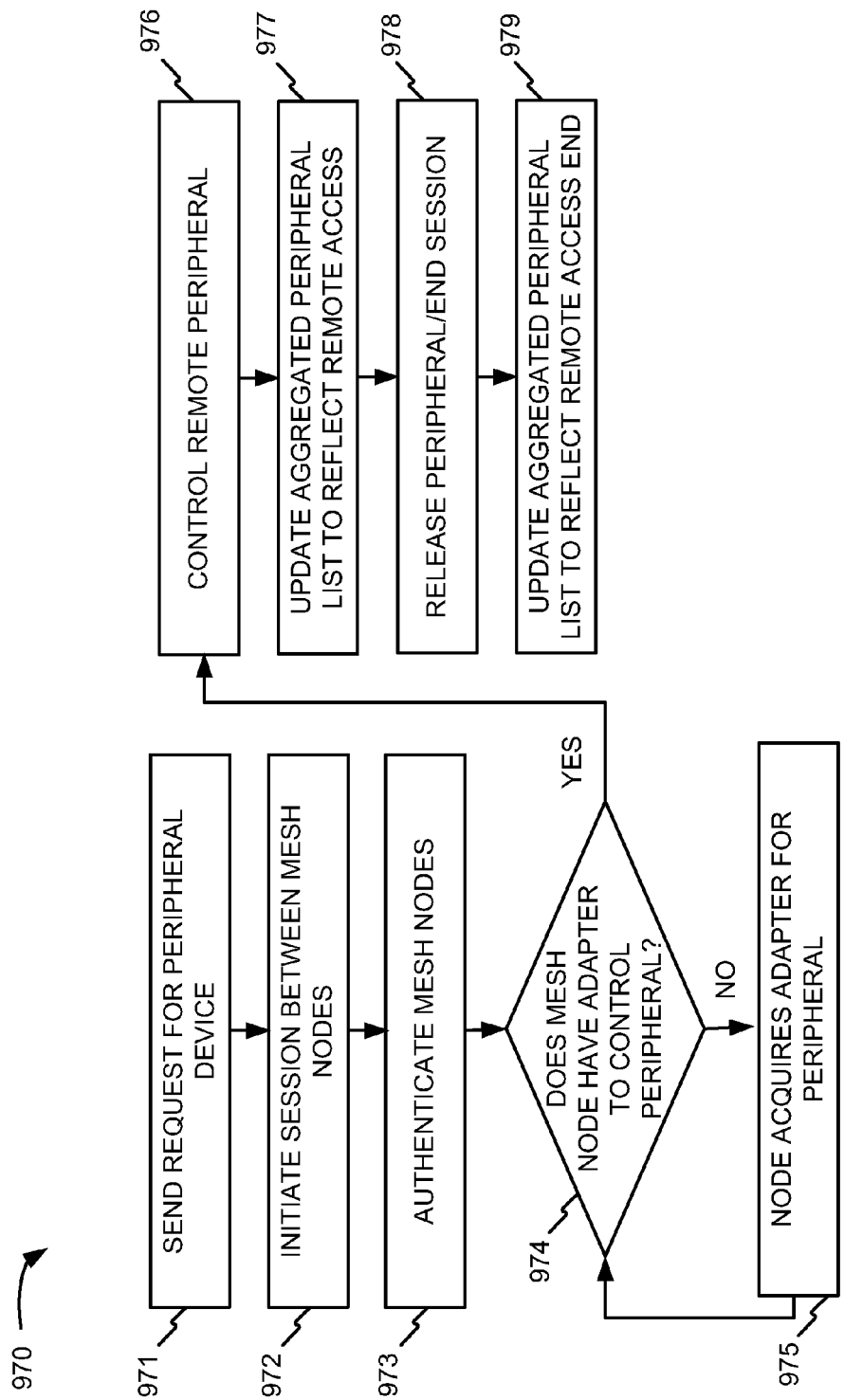

FIGS. 9A and 9B provide a flow chart of an example process 900 for exchanging information regarding peripheral devices available in a mesh and then negotiating remote access to one of the peripheral devices. Some or all of process 900 may be performed by one or more computer devices associated with a subscription multimedia service, such as user device 230 and/or by one or more devices associated with a user and not associated with the subscription multimedia service, such as user device 280. In some implementations, some or all of process 900 may also be performed by one or more servers (e.g., backend server 210, application server 220) in association with user device 230.

As depicted in FIG. 9A, process 900 may include joining a mesh (block 910). For example, as described above in connection with FIG. 2, a device, such as user device 230/280, may join a mesh 201, for example, by detecting communications from router 240, receiving an invitation or request entry into mesh 201, establishing a session between the device and router 240 or other user device 230/280 already in the mesh to exchange data and to negotiate admissions into the mesh, and joining the mesh according to the negotiated admissions rules. For example, to join a mesh (in block 910), a node, such as user device 230/280, may agree, for example, to implement a mesh application to provide information related to peripheral device(s) on the node and to share access to the peripheral device(s). User device 230/280 joining mesh 201 may also exchange authentication data with the router 240 or other user device 230/280 already in mesh 201. For example, user device 230/280 may provide a certain code or perform other actions to authenticate that user device 230/280. User device 230/280 joining a mesh may receive an identifier, such as an IP address, and this identifier may correspond to mesh node identifier 710 depicted in FIGS. 7A and 7B. In this way, the mesh 201 can be formed in an ad-hoc fashion as nodes when user device 230/280 enters and/or leaves the user's premises.

Process 900 may further include receiving mesh application data (block 920). For example, upon joining the mesh (block 910), a node, such as user device 230/280, may receive mesh application data, which may correspond, for example, to mesh application data depicted in FIG. 8. The mesh application data, received in block 920, may include, for example, instructions for peripheral device discovery and publication, for mesh node authentication, for peripheral sharing adapters, and/or for a user interface and profile manager client. For example, as described above with respect to FIG. 6, a device, such as user device 230/280, may form a peripheral device list that may identify available peripheral devices associated with that device.

As depicted in FIG. 9A, process 900 may further include devices in the mesh exchanging peripheral lists (block 930). For example, a device, such as user device 230/280, may exchange its peripheral list with another mesh node, another user device 230/280. Likewise, a device, such as user device 230/280, may receive a peripheral list from a mesh node, such as another user device 230/280, and forward the received peripheral list to the another mesh node, such as a third user device 230/280.

Process 900 may further include forming an aggregated peripheral list (block 940). For example, one or more of the devices on mesh 201, such as user device 230/280, may form an aggregated peripheral device list based on peripheral list(s) exchanged in block 930, and the aggregated peripheral device list may correspond, for example to aggregate peripheral device listing 700 depicted in FIGS. 7A and 7B. In a decentralized mesh, the aggregated peripheral device list may be stored on each of the devices, such as user device 230/280, in the mesh. In the alternative, such as in a centralized mesh, the aggregated peripheral device list may be stored on particular one(s) of the devices, such as user device 230/280, in the mesh, such as a mesh node accesses the aggregated peripheral device list stored on particular one(s) of the nodes in the mesh when identifying a location of needed peripheral. Alternatively, the aggregated peripheral device list may be stored off the mesh, such as at backend server 210 or at a data network accessed via backend server 210.

Process 900 may further include determining, by a mesh node, a need for a peripheral device (block 950). For example, user device 230/280 may activate an application or receive a user input directed to a particular peripheral device or type of peripheral device, and in response, user device 230/280 determine that the particular peripheral device or type of peripheral device is not available on that user device 230/280.

Process 900 may further include identifying a location of the needed peripheral device (block 960). For example, a mesh node, such user device 230/280, may locate a peripheral device using the aggregated peripheral list formed in block 940. For example, a user interface and profile manager client included in the received mesh application data, received at block 920, may display relevant portions of the aggregated peripheral device list, depicted for example, in FIGS. 7A and 7B, including, for example, identifiers, such as an IP address on the mesh, of the mesh nodes associated with the requested peripheral devices and/or identifiers, such as IP addresses on the mesh, for the peripheral devices. As further described above in the discussion of FIGS. 7A and 7B, the aggregated peripheral device list may indicate, for example, an availability of a peripheral device, and a user interface and profile manager client may prevent a user from selecting an unavailable device or, in the alternative, the user interface and profile manager client may allow the user to assume control of an unavailable peripheral device. Alternatively, concurrent requests for access to a peripheral device may be moderated according to particular policy rules, such as to prioritize requests associated with certain mesh nodes(s), such as user device 230/280, to prioritize requests associated with certain applications, or to otherwise prioritize request according to network-defined or user-defined criteria.

Process 900 may further include remotely accessing a located peripheral device (block 970). Remote access, via a mesh, of a peripheral device (in block 970) may include, for example, exchange of commands from a requested mesh node, such user device 230/280 to another mesh node, such as user device 230/280, where the requested peripheral device is located.

As depicted in FIG. 9B, remote access, via a mesh, of a peripheral device in block 970 may include a mesh node sending a request for a located peripheral device (block 971). For example, as user of a mesh node, such as user device 230/280, may select the peripheral device via a user interface and profile manager client implemented on the mesh node, and the mesh node may send a request message to the mesh node, such as user device 230/280, associated with the requested peripheral device.

Remote access, via a mesh, of a peripheral device in block 970 may further include initiating a session between mesh nodes (block 972). For example, a mesh node, such as user device 230/280, requesting access to a peripheral device may initiate a session with another mesh node associated with the selected peripheral device. For example, mesh node, such as user device 230/280, requesting access to a peripheral device may send a session initiation request to a mesh IP address associated with the other mesh node.

Remote access of a peripheral device, in block 970, may further authentication of one or more of the mesh node (block 973). For instance, in the session initiated in block 972, the mesh nodes may authenticate the request for peripheral device to prevent, for example, an undesired third party from acquiring control of the peripheral device. For example, a mesh node, such as user device 230/280, may forward appropriate credentials when requesting access to a peripheral, and a receiving mesh node, associated with the peripheral device, may verify credentials of the requesting mesh node to access a peripheral device, or in the alternative, a trusted one of the mesh nodes, such as user device 230/280, may authenticate a request from another mesh node, such as user device 230/280, to access a peripheral device associated with a third mesh node, such as another user device 230/280. A mesh node may be authenticated, in block 973, each time a request for a peripheral is exchanged or, alternatively, a mesh node may exchange authentication information at another time, such as when joining a mesh (in block 910), with authentication of the mesh node being retained to enable later access to a peripheral with reduced or no additional authentication.

Remote access of a peripheral device, in block 970, may further include determining whether a mesh node has an appropriate adapter to control the requested peripheral (block 974). For example, the mesh node may determine whether a similar peripheral device has previously been controlled and may then use a corresponding adapter that was previously used. As described above with respect to FIGS. 3B and 5B, a peripheral control may include, for example, various protocols or applications for controlling various types of peripheral devices.

If the mesh node does not have an appropriate adapter to control the peripheral device, the mesh node may acquire the appropriate adapter (block 975). For example, as described with respect to FIG. 8, a mesh node may acquire an adapter, for example, through another mesh node, such a user device 230/280, or the mesh node may acquire an adapter, for example, through backend server 210 or storage accessed via backend server 210. The mesh node may acquire the adapter to control the peripheral device in response to requesting the peripheral device or, in the alternative, a mesh node may previously acquire the adapter, for example, when joining the network in block 910.

Remote access of a peripheral device, in block 970 may further include controlling a remote peripheral (block 976). The mesh node, such as user device 230/280, may directly control the peripheral device. For example, the mesh node may forward packets containing commands, formatted according to the adapter, to an IP address associated with the peripheral device or an IP address of a mesh node associated with the peripheral device. Alternatively, the requesting mesh node, such as user device 230/280, may forward commands to another mesh node, such as user device 230/280, and this other mesh node may convert the command to enable the requesting mesh node to control the requested peripheral device.

Remote access of a peripheral device, in block 970, may further include updating the aggregated peripheral device list to reflect the remote access, by a mesh node, of the peripheral device (block 977). For example, when the mesh node, such as user device 230/280, is controlling the peripheral, the aggregated peripheral device list (formed in block 940) may be updated to reflect an unavailability of the peripheral device.

Remote access of a peripheral device, in block 970, also include ending a session and releasing the peripheral device (block 978). For example, when the mesh node finishes controlling the peripheral device, such as when a user completes a task or an application associated with the peripheral device is deactivated, or when the mesh node leaves the mesh, the session between the mesh nodes ends and the peripheral device is released to allow, for example, another mesh node to access the peripheral device.

Remote access of a peripheral device, in block 970, may further include updating the aggregated peripheral device list to reflect an end of the remote access, by a mesh node, of the peripheral device (block 979). For example, when the mesh node finishes controlling the peripheral, the aggregated peripheral device list may be updated to reflect the availability of the peripheral device.

Referring back to FIG. 9A, process 900 may further include a mesh node leaving the mesh (block 980). For example, the mesh node, such as user device 230/280, may leave the user's premises and/or the mesh node may lose communications with wireless network 250. A device may also leave a mesh in block 980 in response to a user command or when the device fails authentication.

Referring back to FIG. 9A, process 900 may further include the remaining mesh nodes updating the aggregated peripheral list after the node leaves the mesh (block 990). For example, a mesh node, such as user device 230/280, may remove peripheral devices associated with the node that left the mesh from the aggregated peripheral list such that these peripherals associated with the node that left the mesh are no longer available to be remotely accessed.

The foregoing description provides illustration and description, but is not intended to be exhaustive or to limit the implementations to the precise form disclosed. Modifications and variations are possible in light of the above teachings or may be acquired from practice of systems and/or methods disclosed herein. For example, while series of blocks have been described with regard to the flowchart of FIGS. 9A-9B, the order of the blocks may differ in other implementations. Further, non-dependent blocks may be performed in parallel.

It will be apparent that aspects, as described herein, may be implemented in many different forms of software, firmware, and hardware in the aspects illustrated in the figures. The actual software code or specialized control hardware used to implement aspects described herein is not limiting of the invention. Thus, the operation and behavior of the embodiments were described without reference to the specific software code—it being understood that software and control hardware may be designed to implement the aspects based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
 joining, by a user device, a mesh that includes a plurality of other user devices;
 receiving, by the user device, data associated with a plurality of first peripheral devices, each of the plurality of first peripheral devices being associated with, respectively, one of the plurality of other user devices;

forwarding, by the user device to at least one of the plurality of other user devices, data associated with one or more second peripheral devices associated with the user device;

detecting, by the user device, user input related to an application on the user device;

determining, by the user device and responsive to the detecting, a particular type of peripheral device associated with executing the application;

determining, by the user device, that the particular type of peripheral device does not correspond to the one or more second peripheral devices;

identifying, by the user device and responsive to the determining that the particular type of peripheral device does not correspond to the one or more second peripheral devices, one or more of the plurality of first peripheral devices that correspond to the particular type of peripheral device;

presenting, via the user device, a user interface to display at least some of the data associated with the identified one or more of the plurality of first peripheral devices;

selecting, by the user device and based on user input received via the user interface, a particular peripheral device, of the one or more of the plurality of first peripheral devices, the particular peripheral device being associated with another user device, of the plurality of other user devices; and forwarding, by the user device and to the other user device, commands to control the particular peripheral device with respect to the executing of the application.

2. The method of claim 1, further comprising:
forwarding, to the one of the plurality of other user devices, a request to control the particular peripheral device; and
receiving, from the one of the plurality of other user devices, authorization to control the particular peripheral device.

3. The method of claim 1, wherein the identified one or more of the plurality of first peripheral devices includes at least one first peripheral device that is currently unavailable to the user device with respect to the executing of the application.

4. The method of claim 1, further comprising:
forming an aggregate peripheral device listing that includes the data associated with the plurality of first peripheral devices and the data associated with the one or more second peripheral devices.

5. The method of claim 4, further comprising:
receiving, from a particular user device, of the plurality of other user devices, a request to control a particular second peripheral device, of the one or more second peripheral devices, where the request includes authentication information associated with the particular user device;
verifying the authentication information, and
sending, to the particular user device in response to verifying the authentication information, authorization to control the particular second peripheral device.

6. The method of claim 1, where forwarding commands to control the particular peripheral device further comprises:
identifying one of a plurality of sharing adapters associated with the particular peripheral device; and
formatting the commands based on the identified one of the plurality of sharing adapters, wherein the one of the plurality of sharing adapters includes a protocol to format the commands to control the particular peripheral device.

7. The method of claim 1, further comprising:
detecting that a particular other user device, of the plurality of other user devices, has left the mesh, wherein the particular other user device is associated with at least one of the plurality of first peripheral devices; and
removing, from the data, information associated with the at least one of the plurality of first peripheral devices.

8. The method of claim 1, wherein the detecting the user input includes:
detecting an attempt to activate the application for the executing of the application.

9. A device associated with one or more first peripheral devices, the device comprising:
a memory to store one or more instructions; and
a processor to execute the one or more instructions to:
join a mesh that includes a plurality of user devices that differ from the device,
forward, to at least one of the plurality of user devices, data associated with the one or more first peripheral devices,
receive data associated with a plurality of second peripheral devices, each of the plurality of second peripheral devices being associated with, respectively, one of the plurality of user devices,
form an aggregated peripheral list based on the data associated with the one or more first peripheral devices and on the data associated with a plurality of second peripheral devices,
receive, from one of the plurality of user devices, a request to access a particular first peripheral device, of the one or more first peripheral devices,
authenticate the one of the plurality of user devices,
enable, in response to authenticating the one of the plurality of user devices, a session with the one of the plurality of user devices, wherein the session includes:
receiving commands, from the one of the plurality of user devices, for the particular first peripheral device, and
providing the commands to the particular first peripheral device,
detect user input related to an application on the device,
determine, responsive to the detection, a particular type of peripheral device associated with executing the application,
determine that none of the one or more first peripheral devices corresponds to the particular type,
determine, based on the aggregated peripheral list, which of the plurality of second peripheral devices corresponds to the particular type, and
present, via a display of the device, a user interface including a list of the second peripheral devices that correspond to the particular type.

10. The device of claim 9, where the processor is further to:
provide, to the one of the plurality of user devices, a sharing adapter associated with the particular first peripheral devices, where the sharing adapter enables the one of the plurality of user devices to format the commands for the particular first peripheral device.

11. The device of claim 9, where the processor, when authenticating the one of the plurality of user devices, is further to:
authenticate the one of the plurality of user devices in response to one of:
joining the mesh, or
receiving the request.

12. The device of claim 9, where wherein the processor is further to:
- select a particular second peripheral device identified by a user via the user interface, of the listed second peripheral devices, the particular second peripheral device being associated with a particular user device, of the plurality of user devices, and
- forward, to the particular user device, commands to control the particular second peripheral device.

13. The device of claim 12, where the memory is further to store a plurality of sharing adapters, and
where the processor is further to:
- determine whether one or more of the plurality of sharing adapters is associated with the particular second peripheral device, where each of the associated one or more of the plurality of sharing adapters includes a protocol to format commands to control the particular second peripheral device, and
- acquire a new sharing adapter associated with the particular second peripheral device when none of the stored plurality of sharing adapters is associated with the particular second peripheral device.

14. The device of claim 12, where the processor is further to:
- determine that one of the plurality of user devices has left the mesh, where the one of the plurality of user devices is associated with one or more of the plurality of second peripheral devices; and
- remove, from the data, information associated with the one or more of the plurality of second peripheral devices.

15. The device of claim 12, where the processor is further to:
- forward, to one or more of the plurality of user devices, the aggregated peripheral list.

16. A non-transitory computer-readable medium for storing one or more instructions executable by a processor in a user device, the one or more instructions including:
- one or more instructions to establish a wireless mesh that includes a plurality of user devices, including the user device;
- one or more instructions to form a list that includes information regarding a plurality of peripheral devices, each of the plurality of peripheral devices being associated with, respectively, one of the plurality user devices;
- one or more instructions to detect user input at the user device related to executing an application on the user device;
- one or more instructions to determine a particular type of peripheral device associated with the executing;
- one or more instructions to identify one or more of the plurality of peripheral devices that correspond to the particular type of peripheral device;
- one or more instructions to present, via a display of the user device, at least some of the information regarding the identified one or more of the plurality of peripheral devices;
- one or more instructions to receive, via the user interface, user selection of a particular peripheral device, of the identified one or more of the plurality of peripheral devices, the particular peripheral device being associated with a particular user device, of the plurality of user devices; and
- one or more instructions to form a session with the particular user device, where the session enables the user device to provide commands to the particular peripheral device via the particular user device.

17. The non-transitory computer-readable medium of claim 16, wherein the one or more instructions further comprise:
- one or more instructions to receive, from one of the plurality of user devices, a request to control another of the plurality of peripheral devices, wherein the other of the plurality of peripheral devices is associated with the user device, and wherein the request includes authentication information associated with the one of the plurality of user devices; and
- one or more instructions to send, to the one of the plurality of user devices, authorization to control the other of the plurality of peripheral devices.

18. The non-transitory computer-readable medium of claim 16, wherein the one or more instructions to form the session further include:
- one or more instructions to exchange, between the user device and the other of the plurality of user devices, authentication information; and
- one or more instructions to enable the user device to provide commands in response to a verification of the authentication information.

19. The non-transitory computer-readable medium of claim 16, wherein the one or more instructions to form the session further include:
- one or more instructions exchange provide a sharing adapter associated with the particular peripheral device, wherein the sharing adapter enables the user device to format the commands to the particular peripheral device to enable the user device to control the particular peripheral device.

20. The non-transitory computer-readable memory of claim 16, wherein the one or more instructions to form a list further include:
- one or more instructions to identify available ones of the plurality of peripheral devices, wherein the available ones, of the plurality of peripheral devices, are not being used by one the plurality of user devices, and
- wherein the one or more instructions to identify the one or more of the plurality of peripheral devices further include:
- one or more instructions to select the one or more of the plurality of peripheral devices from the available ones of the plurality of peripheral devices.

21. The non-transitory computer-readable memory of claim 16, wherein the one or more instructions further comprise:
- one or more instructions to detect that an additional user device has joined the mesh, wherein the additional user device is associated with additional peripheral devices; and
- one or more instructions to add, to the list, data associated with the additional peripheral devices.

* * * * *